(12) United States Patent
Kim

(10) Patent No.: US 8,672,105 B2
(45) Date of Patent: Mar. 18, 2014

(54) DAMPING CONTROL DEVICE FILLED WITH MAGNETORHEOLOGICAL FLUID AND ENGINE MOUNT HAVING THE SAME

(75) Inventor: Jang-Ho Kim, Buchun-shi (KR)

(73) Assignee: Hyundai Motor Company, Seoul (KR)

( * ) Notice: Subject to any disclaimer, the term of this patent is extended or adjusted under 35 U.S.C. 154(b) by 156 days.

(21) Appl. No.: 13/274,890

(22) Filed: Oct. 17, 2011

(65) Prior Publication Data
US 2012/0132492 A1 May 31, 2012

(30) Foreign Application Priority Data
Nov. 30, 2010 (KR) ........................ 10-2010-0120967

(51) Int. Cl.
*F16F 9/53* (2006.01)

(52) U.S. Cl.
USPC .............. 188/267.2; 267/140.14; 267/140.15

(58) Field of Classification Search
USPC ....................... 188/267.2; 267/140.14, 140.15
See application file for complete search history.

(56) References Cited

U.S. PATENT DOCUMENTS

| | | | | |
|---|---|---|---|---|
| 5,398,917 A | * | 3/1995 | Carlson et al. | 267/140.14 |
| 6,412,761 B1 | * | 7/2002 | Baudendistel et al. | 267/140.14 |
| 6,622,995 B2 | * | 9/2003 | Baudendistel et al. | 267/140.14 |
| 7,070,708 B2 | * | 7/2006 | Iyengar et al. | 252/62.52 |
| 7,118,100 B2 | * | 10/2006 | Tewani et al. | 267/140.15 |
| 8,100,388 B2 | * | 1/2012 | Lee et al. | 267/140.14 |
| 8,387,959 B2 | * | 3/2013 | Kim | 267/140.14 |
| 2009/0057968 A1 | | 3/2009 | Loheide et al. | |
| 2012/0006635 A1 | * | 1/2012 | Gade et al. | 188/267.2 |
| 2013/0032229 A1 | * | 2/2013 | Kim | 137/561 A |

FOREIGN PATENT DOCUMENTS

| | | | |
|---|---|---|---|
| JP | 2002-206591 A | | 7/2002 |
| JP | 2004-232706 A | | 8/2004 |
| JP | 2004-232706 A | * | 8/2004 |
| JP | 2004-232708 A | | 8/2004 |

* cited by examiner

*Primary Examiner* — Thomas J Williams
*Assistant Examiner* — Mariano Sy
(74) *Attorney, Agent, or Firm* — Morgan, Lewis & Bockius LLP

(57) ABSTRACT

A damping control device includes a lower core, a nonmagnetic orifice, an upper core, and a membrane made of an elastic material to shield a lower end of the lower core, and in which the lower core and the upper core are magnetized when a current is applied to the coil, and a predetermined amount of the MR fluid is filled therein, such that the MR fluid flows between the pressure applying plate and the upper plate according to an elastic compression of the membrane.

8 Claims, 11 Drawing Sheets

FIG. 1C (Prior Art)
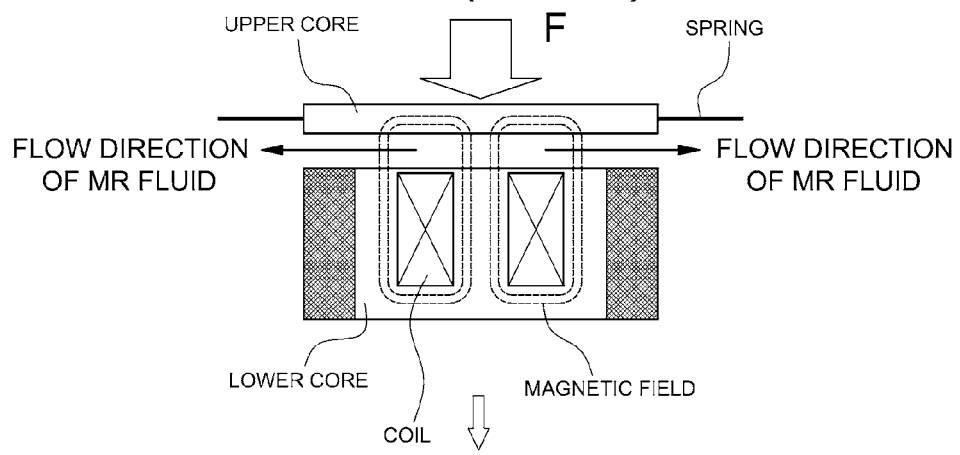
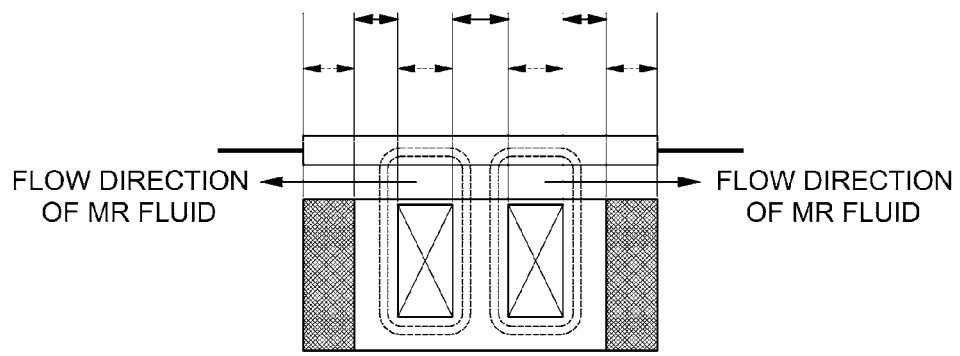
| ⟵——⟶ | CONTROL VALIDITY SECTION |
| ⟵----⟶ | CONTROL INVALIDITY SECTION |

FIG. 3
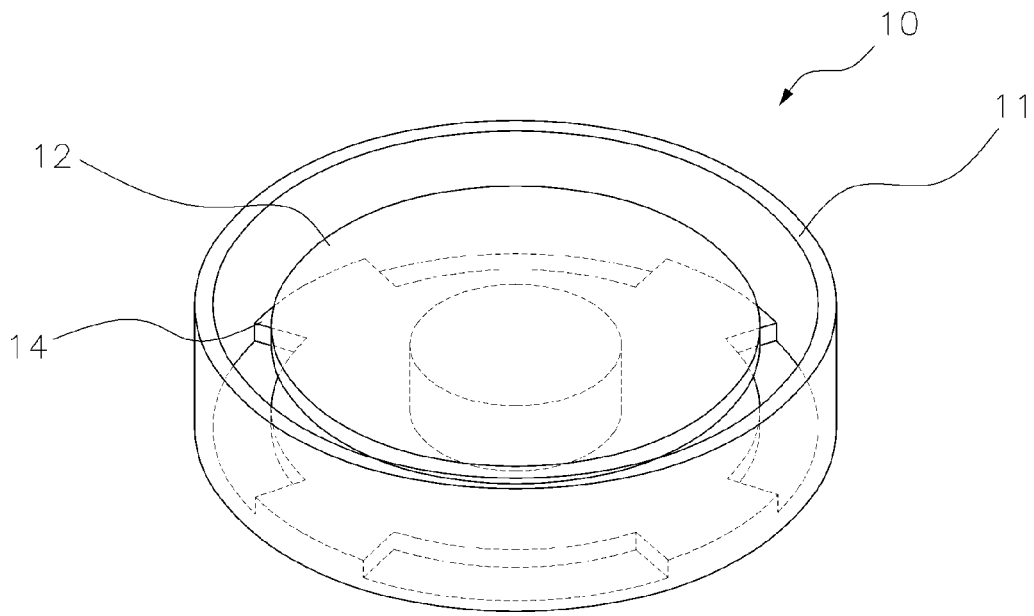
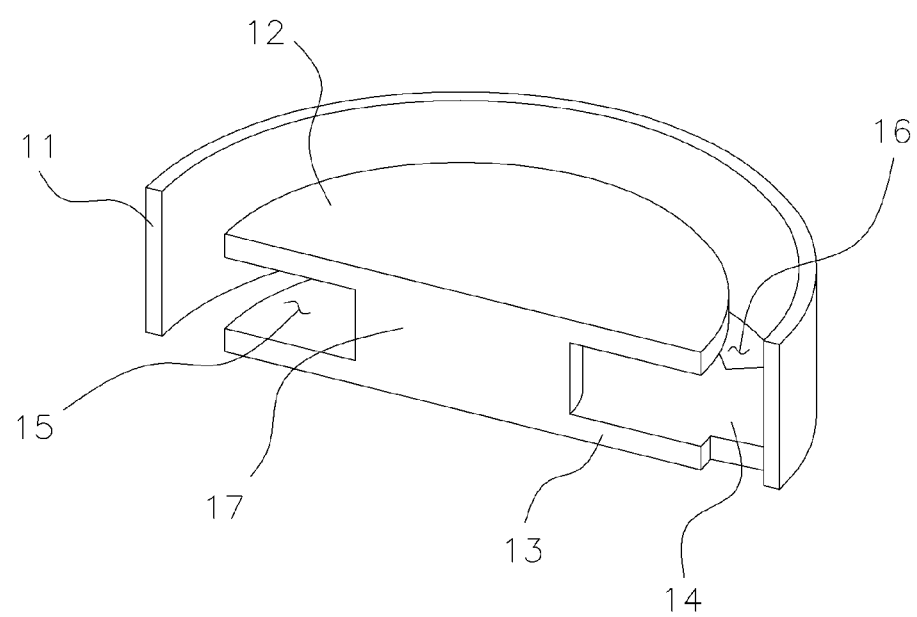

FIG. 4
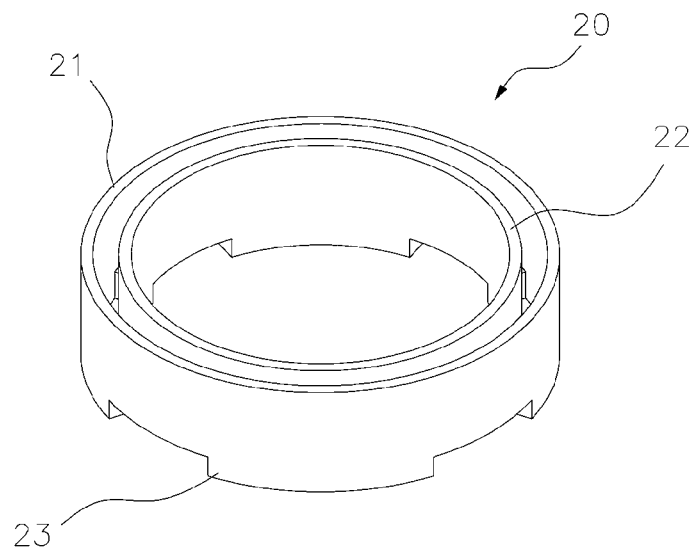
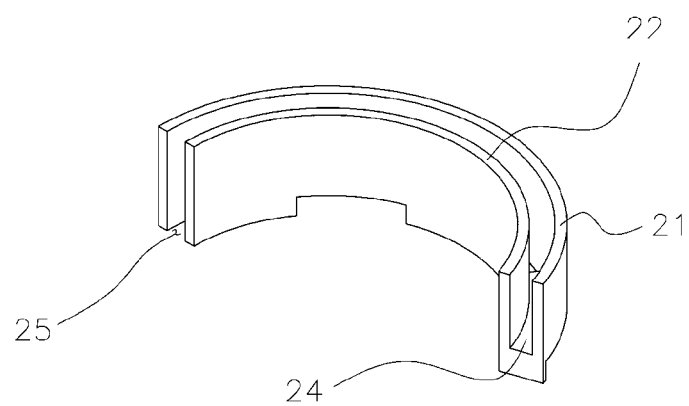
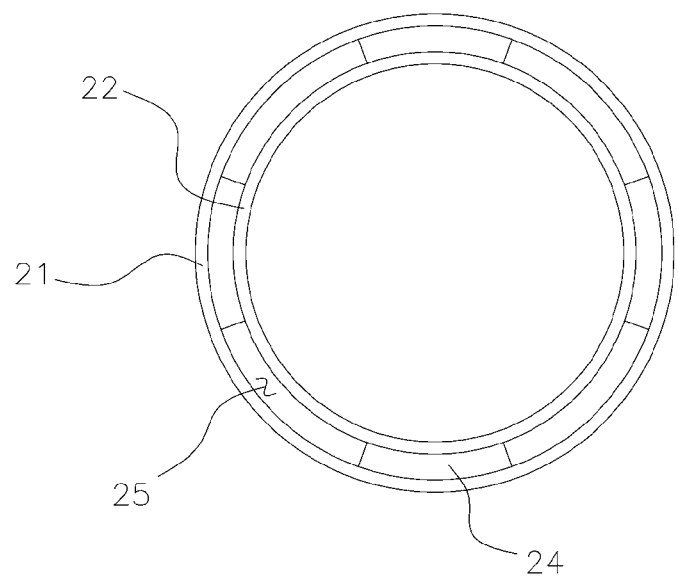

FIG. 5
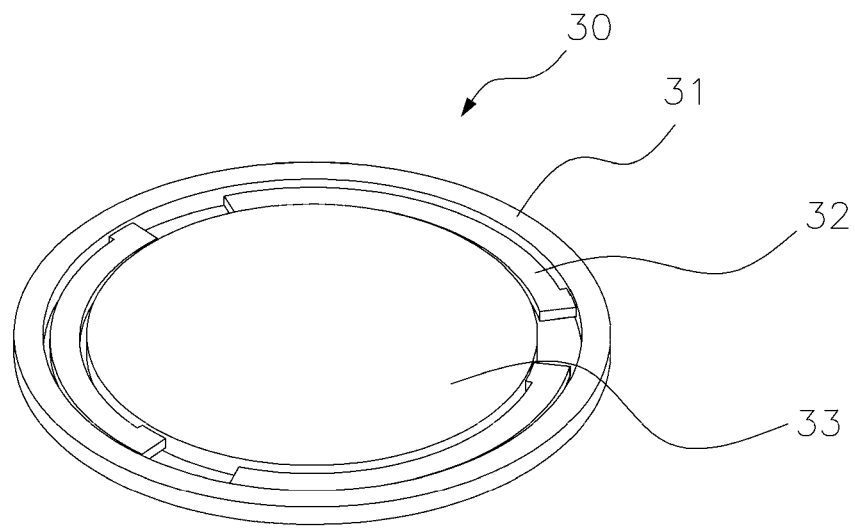
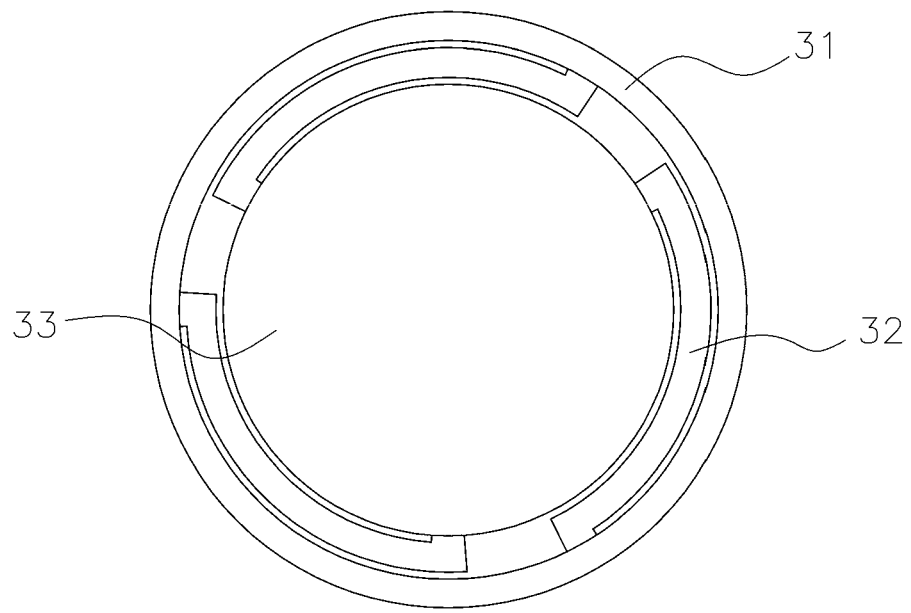

FIG. 9
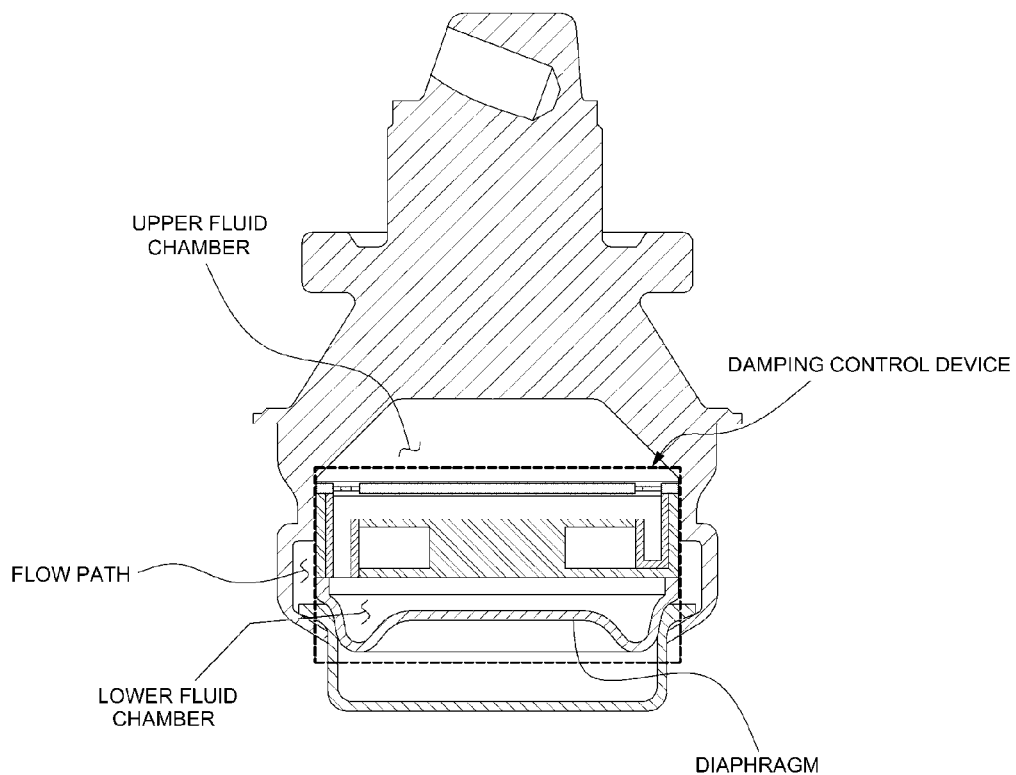
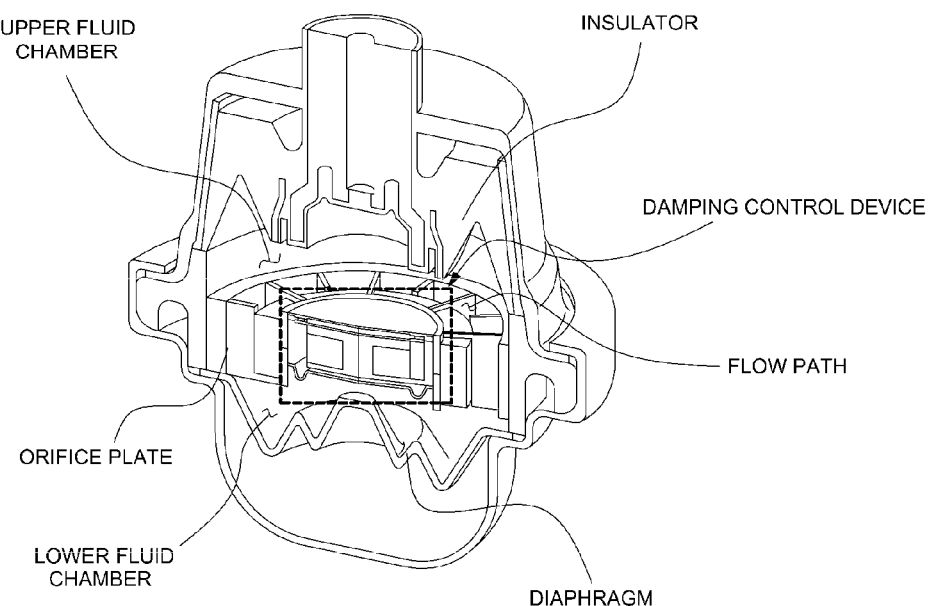

DAMPING CONTROL DEVICE FILLED WITH MAGNETORHEOLOGICAL FLUID AND ENGINE MOUNT HAVING THE SAME

CROSS-REFERENCE TO RELATED APPLICATIONS

This application claims priority under 35 U.S.C. §119 to Korean Patent Application No. 10-2010-120967, filed on Nov. 30, 2010, the entire contents of which application is incorporated herein for all purposes by this reference.

BACKGROUND OF INVENTION

1. Field of Invention

The present invention relates to a damping control device damping vibration and an engine mount having the damping control device. In particular, the present invention relates to a damping control device filled with a magnetorheological fluid (hereinafter, referred to as a MR fluid) which controls a vibration damping ratio by changing a shear stress of the MR fluid according to a current externally provided, and more efficiently controls the flow of the MR fluid by removing a 'control invalidity section', unlike the related art, and an engine mount having the damping control device.

2. Description of Related Art

The MR fluid (magnetorheological fluid) is a suspension which is a synthetic hydrocarbon liquid containing soft magnetic particles, and has the property in that a shear stress is changed depending on the intensity of a peripheral magnetic field.

Application of a device which controls an MR fluid by using a continuous change of a shear stress according to the intensity of a magnetic field to not only a general mechanical device such as a damper and a valve but also a device for a vehicle such as an engine mount and a shock absorber is being attempted.

As shown in FIG. 1A, if there is no magnetic field at the periphery of the MR fluid, the particles dispersed in the MR fluid moves freely, but if a magnetic field is formed at the periphery of the MR fluid, the particles in the MR fluid are aligned perpendicular to the formation direction of the magnetic field. The flow characteristic of the MR fluid is changed depending on the movement of the particles.

Modes of controlling the MR fluid are classified into a flow mode and a squeeze mode according to the relative movement between the formation of the magnetic field and the MR fluid.

The flow mode is a mode which generates a volume flow q of the MR fluid between an upper core and a lower core according to a pressure difference $P_1$-$P_2$ between both sides and provides a current $i_A$ to a coil so as to form a magnetic field, thereby aligning the particles of the MR fluid. The volume flow q of the MR fluid is determined by the intensity of the current $i_A$. Therefore, the pressure and flow rate of the MR fluid simultaneously change in a flow path, but there is no pressure externally applied.

In the squeeze mode, a core plate (a pressure applying plate) is disposed between an upper core and a lower core. If an external force F is applied to the pressure applying plate, the pressure applying plate presses the MR fluid such that the MR fluid moves leftward and rightward (in FIG. 1A). At this time, if a current $i_A$ is applied to a coil mounted on the upper core, a magnetic field B is formed perpendicular to the movement direction of the MR fluid at the same time as the application of the current to the coil, whereby the shear stress of the MR fluid varies, resulting in a change in the fluidity of the MR fluid. A damping control device using the squeeze mode is a configuration which controls the current applied to the coil so as to vary the volume flow of the MR fluid, thereby damping the vibration of the pressure applying plate receiving the external force F between the upper core and the lower core.

Meanwhile, an engine mount is mounted in an engine room of a vehicle so as to prevent vibration of the engine from being directly transmitted to the body of the vehicle. As the engine mount, a rubber mount using the elasticity of an insulator material and a hydro mount using a fluid elasticity effect by making a hydro liquid filled therein flow according to the elasticity of an insulator are generally used. As shown in FIG. 1B, in the hydro mount, the hydro liquid is contained in an internal space formed by the insulator and a diaphragm, and the internal space is divided into an upper fluid chamber and a lower fluid chamber by an orifice plate placed therein. The orifice plate has a ring-shaped (or other shapes of) flow path which is formed inside along the edge of the orifice plate and through which the hydro liquid flows. At the center of the orifice plate, a decoupler may be additionally mounted. Further, the insulator is connected to a stud which is connected to a bracket of the engine. Therefore, if elastic compression and restoration of the insulator made of an elastic material are repeated according to a load applied to the stud, the hydro liquid flows between the upper fluid chamber and the lower fluid chamber through the flow path. The flow of the hydro liquid vibrates the decoupler. Therefore, vibration in a high frequency band vibration is damped by the vibration of the decoupler and vibration in a low frequency band is damped by the flow of the hydro liquid through the flow path.

However, the hydro mount exhibits an effective vibration insulation performance only at a resonance point. For this reason, a hydro mount which is filled with an MR fluid and has a coil additionally mounted therein to more actively control vibration according to the running condition of a vehicle has been developed.

Meanwhile, a damping control device according to the related art which controls an MR fluid by using the squeeze mode or a hydro mount filled with an MR fluid operates as shown in FIG. 1C.

As shown in FIG. 1C, an upper core and a lower core are disposed to be spaced apart from each other so as to form a flow path through which the MR fluid can flow. The upper core is supported by a spring to be moveable upward and downward (to perform the same function as the core plate shown in FIG. 1A), and a coil is mounted on the lower core. When an external force F is applied to the upper core, if a current is applied to the coil, a magnetic field is formed at the periphery of the coil to be perpendicular to the movement direction of the MR fluid so as to increase the shear stress of the MR fluid. Therefore, the movement of the MR fluid is reduced according to the movement of the upper core. In order to implement this function, (as shown in FIG. 1A), it is necessary to align the particles in the MR fluid to be perpendicular to the flow direction. To this end, the flow direction of the MR fluid should be perpendicular to the formation direction of the magnetic field.

However, according to the related art, in a 'control validity section' (in which the magnetic field passes through the MR fluid), the magnetic field is perpendicular to the flow direction of the MR fluid, but in the 'control invalidity section' (in which the magnetic field does not pass through the MR fluid), the magnetic field is formed in parallel to the flow direction of the MR fluid so as not to pass through the MR fluid, resulting in a reduction in the efficiency of MR fluid control.

Therefore, the particles in the MR fluid are aligned perpendicular to the formation direction of the magnetic field only in a partial section of the entire flow path. For this reason, in order to provide the required performance, the reduced control efficiency is recovered by increasing a current value applied to the coil or lengthening the flow path. However, this results in an increase in the size and an increase in the amount of heat generation.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a damping control device filled with an MR fluid which is capable of more efficiently controlling the flow characteristic of the MR fluid, and an engine mount having the damping control device.

Also, the present invention has been made in an effort to provide a damping control device filled with an MR fluid which moves a pressure applying plate by an external force such that the MR fluid flows between a space between the pressure applying plate and an upper plate and a space between a membrane and a lower plate in conjunction with the movement of the pressure applying plate, and applies a current to a coil when the MR fluid flows between the two spaces so as to change the shear stress of the MR fluid, thereby more efficiently controlling the movement of a pressure applying plate which moves or vibrates by the external force, unlike a general solenoid structure in which a current is applied to a coil to move a pressure applying plate.

Various aspects of the present invention provide for a damping control device which includes a lower core including an outer ring, an upper plate and a lower plate disposed inside the outer ring in parallel to each other, a plurality of connections disposed with gaps along the circumference of the lower plate connecting the lower plate to the outer ring, and a coil provided between the upper plate and the lower plate, an orifice formed of a nonmagnetic material and including an outer ring, an inner ring disposed inside the outer ring, and a plurality of connections disposed in a lower end of the orifice between the outer ring and the inner ring with gaps along the circumference and safely seated on the connections of the lower core when the orifice is combined inside the outer ring of the lower core, an upper core including an outer ring brought into close contact with an upper end of the outer ring of the lower core, a circular-plate-shaped pressure applying plate disposed inside the outer ring to face the upper plate apart from the upper plate, and plate springs connecting the outer ring and the pressure applying plate, and a membrane made of an elastic material and combined with the lower core to shield a lower end of the lower core. In the damping control device, the lower core and the upper core are magnetized when a current is applied to the coil, and a predetermined amount of the MR fluid is filled therein, such that the MR fluid flows between the pressure applying plate and the upper plate according to an elastic compression of the membrane.

The damping control device may further include a lower cover combined with a lower portion of the upper core to shield bottom surfaces of the pressure applying plate and the plate springs, and at a lower end of the orifice, engagement protrusions may be formed to be inserted into the gaps between the adjacent connections of the lower core.

Further, each of the plate springs may have an arc bar shape, and have one end combined with an inner circumferential surface of the outer ring of the upper core and the other end combined with an outer circumferential surface of the pressure applying plate. On a lower portion of the membrane, an elastic membrane cover may be additionally combined.

Other aspects of the present invention provide for an engine mount including a damping control device as described above. That is, another exemplary embodiment of the present invention provides an engine mount in which a hydro liquid flows between an upper fluid chamber and a lower fluid chamber along a flow path according to elastic compression of an insulator, which includes a damping control device having the configuration as described above. In the engine mount, the damping control device is provided between the upper fluid chamber and the lower fluid chamber such that a pressure applying plate is elastically compressed according to the flow of the hydro liquid.

The damping control device may be provided to be in close contact with an inner circumferential surface of the insulator to divide the upper fluid chamber and the lower fluid chamber from each other (to take the place of the orifice plate and the membrane according to the related art). Further, a flow path connecting the upper fluid chamber and the lower fluid chamber may be formed in various forms in the insulator.

Various aspects of the present invention are directed to the engine mount may further include an orifice plate dividing the upper fluid chamber and the lower fluid chamber from each other and having a flow path formed therein, and the damping control device may be provided in a hole formed at the center of the orifice plate.

According to the exemplary aspects of the present invention, the damping control device having the above-mentioned configuration can more effectively control the flow characteristic of the MR fluid by inducing the formation of the magnetic field to be perpendicular to the flow direction of the MR fluid in the entire flow path through which the MR fluid flows without any 'control invalidity section'.

Therefore, it is possible to operate the damping control device with a relatively low current or to reduce the length of the flow path, thereby preventing an increase in the amount of heat generation and an increase in the volume.

Further, since the engine mount having the damping control device may be mounted instead of an orifice plate of the related art or a decoupler connected to the orifice plate, the engine mount can be additionally mounted to the hydro engine mount of the related art, thereby actively controlling the flow characteristic of the hydro liquid according to the running condition of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1C is a cross-sectional view illustrating an operation of a damping control device filled with an MR fluid according to the related art.

FIG. 3 is a perspective view illustrating an entire shape and cut shape of an exemplary lower core according to the present invention.

FIG. 4 is a perspective view illustrating an entire shape and cut shape of an exemplary orifice according to the present invention and a plan view thereof seen from the top.

FIG. 5 is a perspective view illustrating an exemplary upper core according to the present invention and a plan view thereof seen from the top.

FIG. 9 is a cross-sectional view illustrating engine mounts having an exemplary damping control device according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
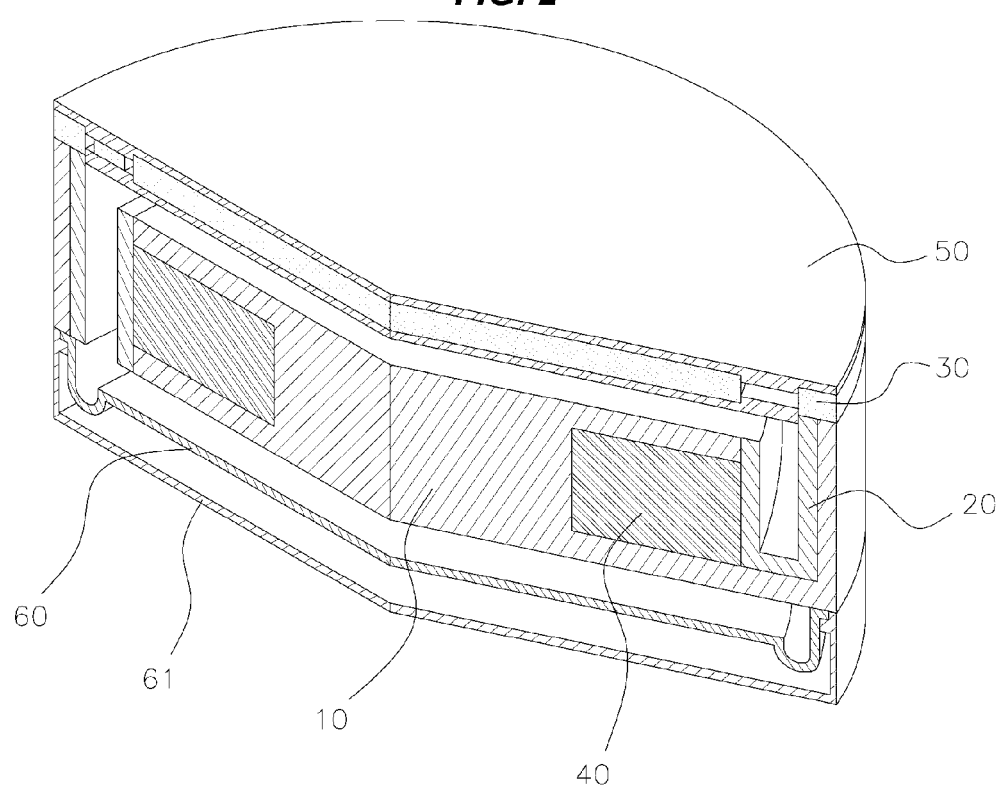
FIG. 2 is a perspective view illustrating an internal cross section of an exemplary damping control device according to the present invention.

Referring to FIG. 2, various embodiments of the present invention has a configuration in which a lower core 10, an orifice 20, and an upper core 30 are mounted on a membrane 60 to form a shielded internal space and the internal space is filled with a predetermined amount of MR fluid.

The membrane 60 is connected with a membrane cover 61, and the membrane 60 and the membrane cover 61 are made of an elastic material to be capable of vibrating according to an external load or vibration.

Further, the lower core 10 is connected to a coil 40 and is made of a metal material to be magnetized to form a magnetic field at the periphery when a current is applied to the coil 40. As shown in FIG. 3, in the lower core 10, an upper plate 12 and a lower plate 13 are disposed in parallel to each other inside a pipe-shaped outer ring 11. The upper plate 12 and the lower plate 13 are connected to each other through a cylindrical column 17 and the ring-shaped coil 40 is mounted in an outer space 15 of the column 17. Further, the lower plate 13 is connected to the lower end of the outer ring 11 through a connection 14. The connection 14 may be formed in plural along the circumference of the lower plate 13, and the plurality of connections 14 may be spaced apart from each other to form gaps 16.

As shown in FIG. 4, the orifice 20 has a configuration in which two pipes with different diameter are nested, that is, an inner ring 22 is disposed inside an outer ring 21 with a larger diameter, and the outer ring 21 and the inner ring 22 are connected by a plurality of connections 24. The orifice 20 is made of a nonmagnetic material such as a synthetic resin material, and gaps 25 are formed between the connections 24. Further, the orifice 20 protrudes downward at the formation sections of the gaps 25 so as to form engagement protrusions 23. Therefore, when the orifice 20 is mounted on the lower core 10, the connections 24 are put on the connections 14 and the engagement protrusions 23 are inserted into the gaps 16 formed between the connections 14, such that the gaps 16 formed between the connections 14 are connected to the gaps 25 formed between the connections 24 so as to form a flow path through which the MR fluid flows.

Further, in the upper core 30, as shown in FIG. 5, a circular-plate-shaped pressure applying plate 33 is disposed inside a ring-shaped outer ring 31, and the pressure applying plate 33 and the outer ring 31 are connected to each other by plate springs 32. The plate springs 32 are formed in an arc bar shape, and each of the plate springs 32 has one end connected to an inner circumferential surface of the outer ring 31 and the other end connected to an external circumferential surface of the pressure applying plate 33. Therefore, the pressure applying plate 33 is elastically movable in an upward and downward direction in which a force is externally applied.

Figure 6:
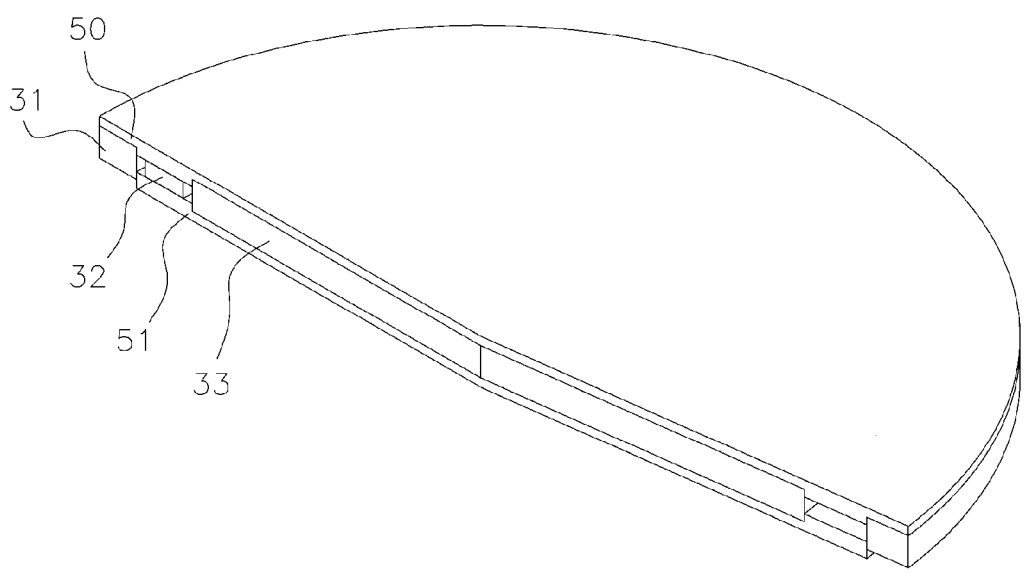
FIG. 6 is a perspective view illustrating an exemplary upper core with a top and a bottom covered by a cover and a lower cover.

The upper core 30 is made of a metal material to be capable of being magnetized and is formed with a size to be capable of being safely seated on the outer ring 11. Further, as shown in FIG. 6, in order to prevent the filled MR fluid from being brought into direct contact with the upper core 30 and from leaking, the top of the upper core 30 is covered by a cover 50 and the bottom of the upper core 30 is covered by a lower cover 51. The cover 50 and the lower cover 51 are put on to shield a gap between the outer ring 31 and the pressure applying plate 33, and the lower cover 51 is formed in a size with a smaller diameter than the cover 50 such that the outer ring 31 is capable of being in close contact with the outer ring 11 of the lower core 10.

Figure 7:
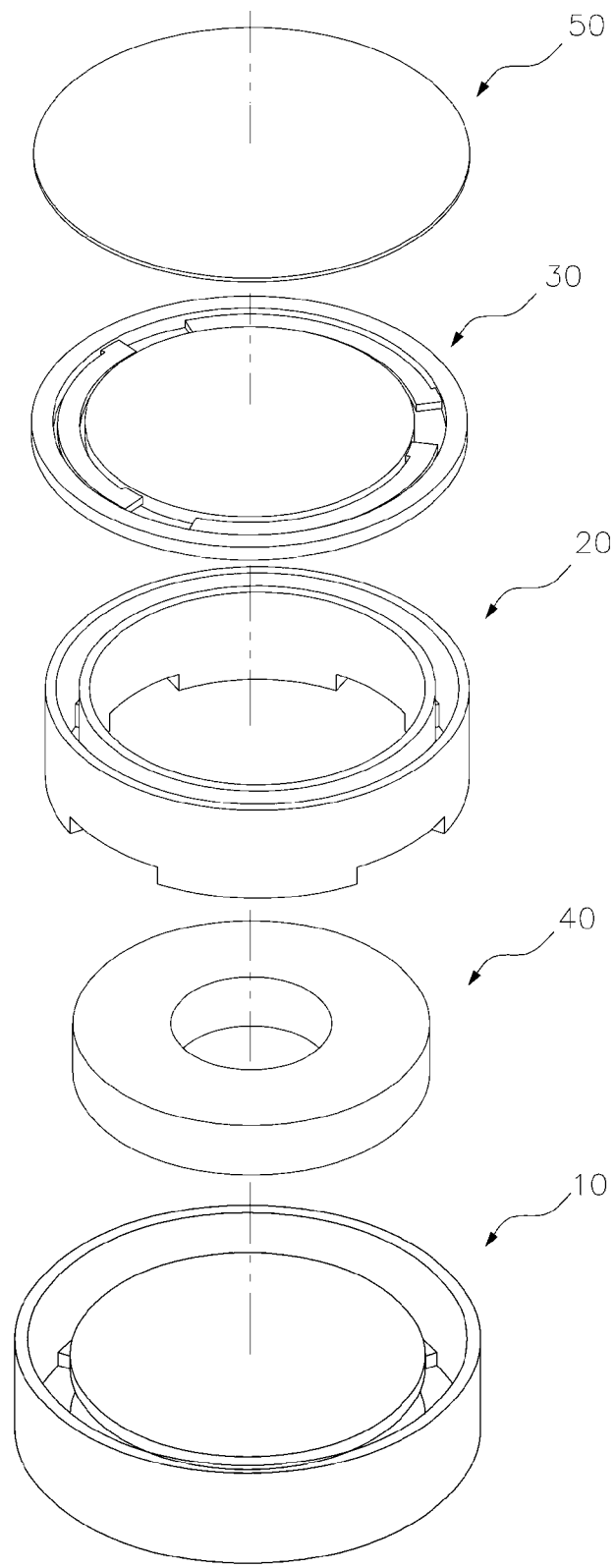
FIG. 7 is a perspective view illustrating an exemplary lower core, orifice, upper core, and cover before assembly according to the present invention.

Therefore, the membrane 60 is provided below the lower core 10, and as shown in FIG. 7, the coil 40, the orifice 20, and the upper core 30 connected with the cover 50 and the lower cover 51 are sequentially combined inside and on the lower core 10.

Figure 8:
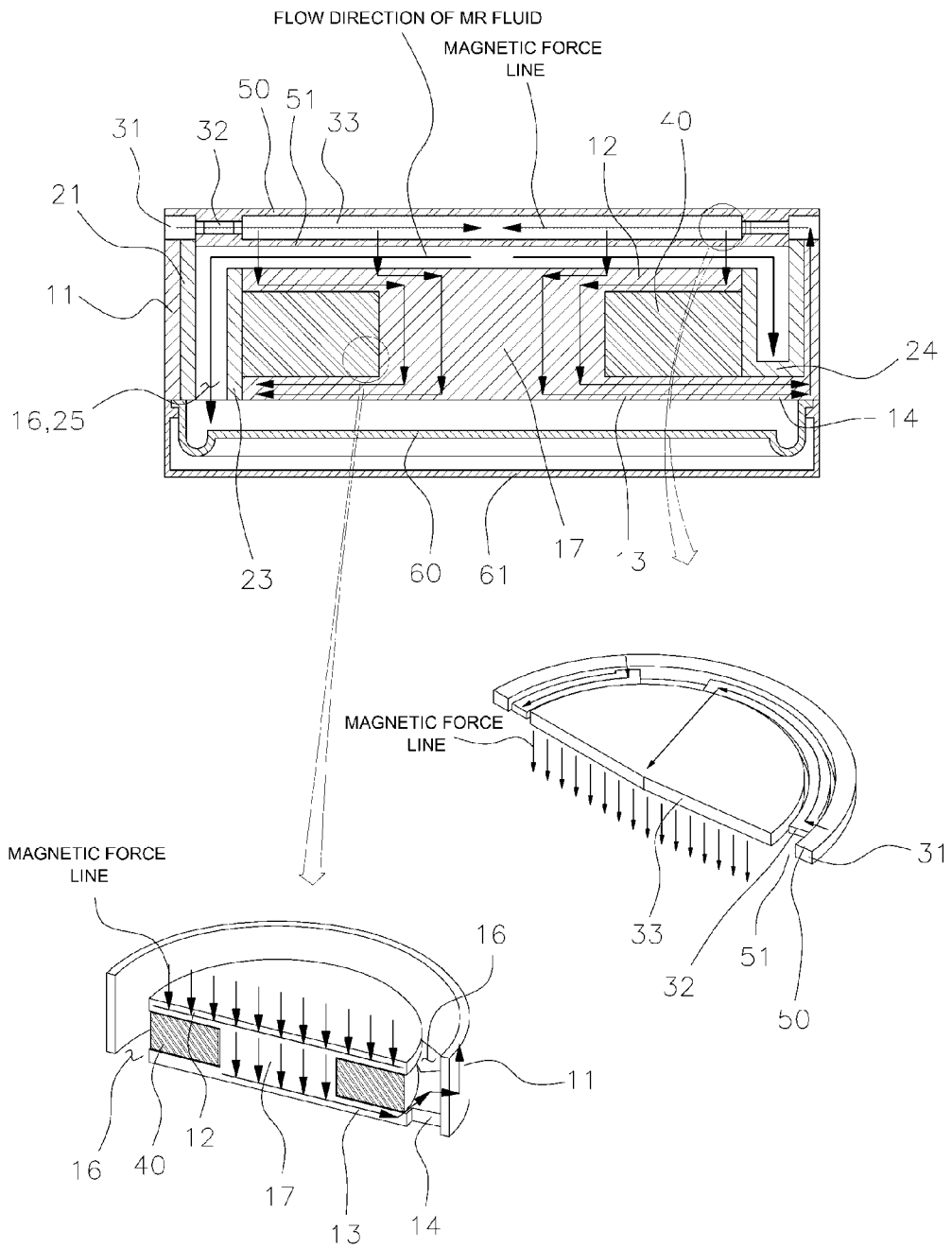
FIG. 8 is a cross-sectional view illustrating an operation of an exemplary damping control device according to the present invention.

In the damping control device configured as described above, as shown in FIG. 8, if a current is applied to the coil 40, the lower core 10 is magnetized to generate magnetic force lines which form a magnetic field. At this time, since the orifice 20 is nonmagnetic and the outer ring 11 of the lower core 10 is in close contact with the outer ring 31 of the upper core 30, the magnetic force lines are generated in directions indicated by arrows.

That is, magnetic force lines are formed to be connected to each other from the lower plate 13 to the connections 14, from the connections 14 to the outer ring 11, from the outer ring 11 to the outer ring 31, from the outer ring 31 to the plate spring 32, and from the plate spring 32 to the pressure applying plate 33, thereby making the entire section between the pressure applying plate and the upper plate become a 'control validity section' (in which the flow direction of the MR fluid is perpendicular to the magnetic field).

Figure 1A:
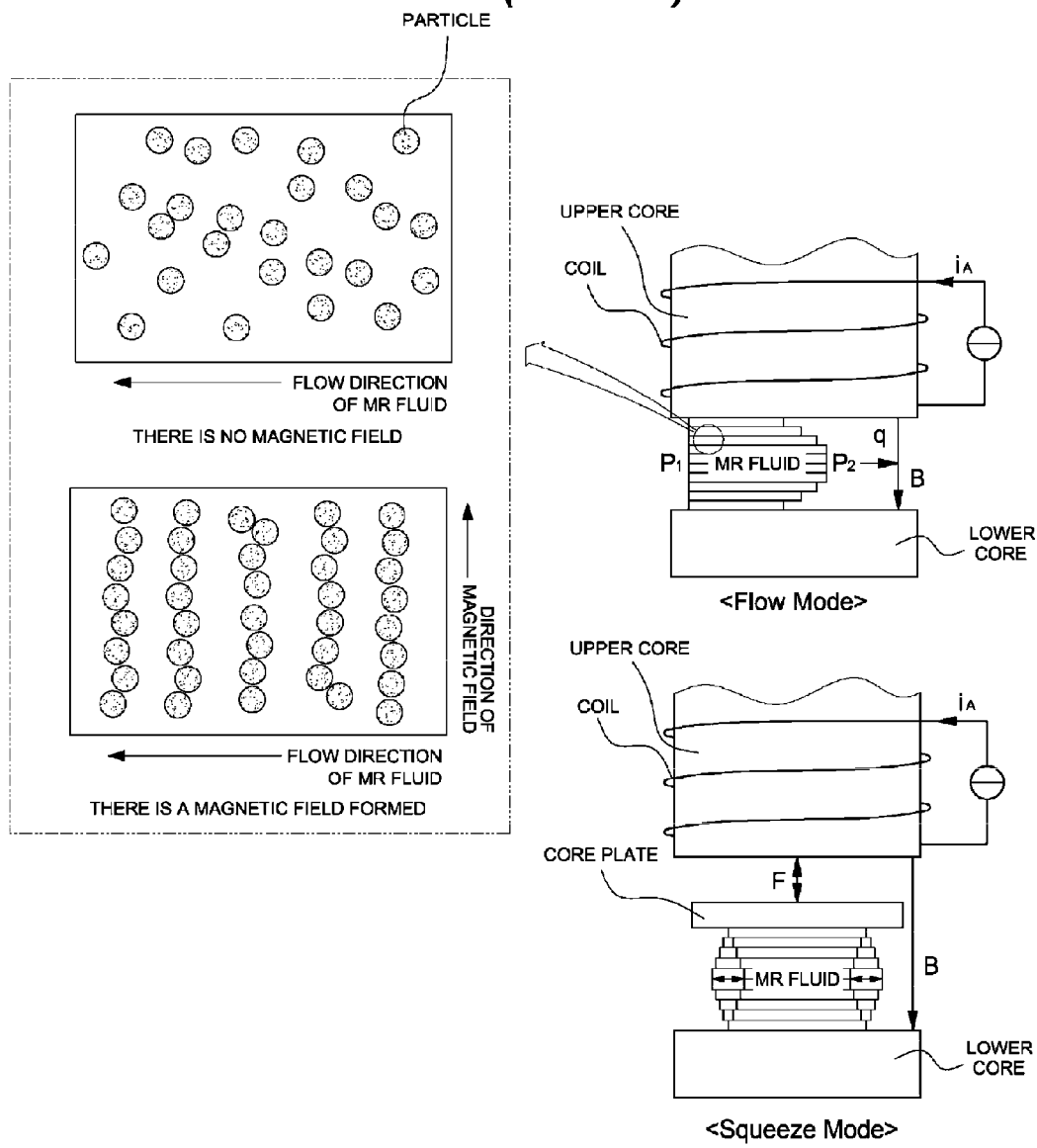
FIG. 1A is a reference view illustrating the movement of particles according to modes of controlling an MR fluid and formation of a magnetic field.
Figure 1B:
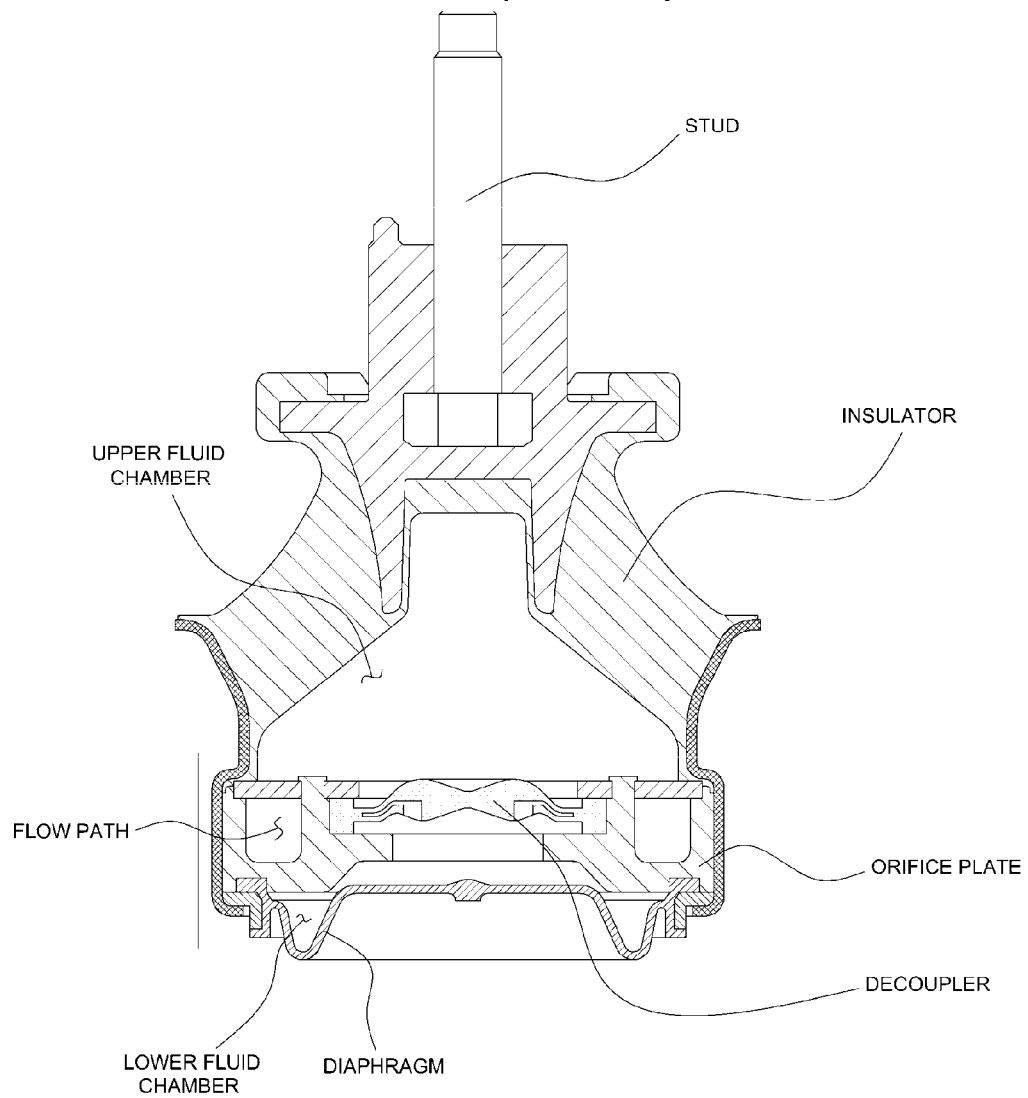
FIG. 1B is a cross-sectional view illustrating a hydro mount filled with a hydro liquid according to the related art.

If an external force is applied to the pressure applying plate 33, the filled MR fluid flows between the internal space and an upper space of the membrane 60 through a gap between the outer ring 21 and the inner ring 22 of the orifice 20 by a change in the pressure between the pressure applying plate 33 and the upper plate 12. At this time, if a current is supplied to the coil 40 to generate magnetic field lines (a magnetic field), the particles in the MR fluid are aligned in lines (as shown in FIG. 1A) by the generated magnetic field lines (the magnetic field). Since the shear stress of the MR fluid increases in proportion to the magnitude of the supplied current, relatively, the pressure applying plate 33 elastically moves like a state with improved rigidity.

Therefore, since the damping control device according to various embodiments of the present invention forms the magnetic field to change the shear stress of the MR fluid by adjusting the amount of current applied to the coil when the MR fluid flows between the 'space between the pressure applying plate 33 and the upper plate 12' and the 'space between the membrane 60 and the lower plate 13 according to vibration externally generated, the damping control device can be controlled to more effectively damp vibration in different frequency bands while using a 'fluid inertia effect' according to the flow of the MR fluid.

The damping control device configured as described above can be applied to various fields, and another exemplary embodiment of the present invention additionally provides an engine mount having a damping control device as described above.

FIG. 9 is a view illustrating that the damping control device according to various embodiments of the present invention is applied to hydro engine mounts in which a hydro liquid is filled, such that the hydro liquid flows between an upper fluid chamber and a lower fluid chamber through a flow path according to an elastic compression of an insulator.

First, referring to an engine mount on the upper side, the damping control device according to various embodiments of the present invention may be mounted instead of the orifice plate of the hydro engine mount according to the related art.

That is, in the engine mount filled with the hydro liquid, the pressure applying plate of the damping control device is configured to vibrate according to external vibration so as to make the internal hydro liquid flow. Therefore, the current applied to the coil when the hydro liquid flows can be controlled to adjust the shear stress of the MR fluid, thereby reducing vibration to be transmitted to the body of the vehicle through the engine mount. In this case, the damping control device according to various embodiments of the present invention takes the place of the functions of the orifice plate and the decoupler according to the related art, and the flow path connecting the upper fluid chamber and the lower fluid chamber (which is formed in the orifice plate in the related art) can be configured by forming an insulator groove in various forms.

Further, even in an engine mount shown in the lower side of FIG. 9, for the same purpose (for the purpose of reducing vibration to be transmitted through the mount), a flow path for connecting the upper fluid chamber and the lower fluid chamber may be formed similarly to the hydro engine mount according to the related art, and the damping control device according to various embodiments of the present invention may be mounted in a hole formed at the center of an orifice plate, instead of the decoupler according to the related art. That is, the damping control device can play a role as a decoupler whose operation frequency varies according to an applied current, unlike the decoupler according to the related art whose operation frequency band is narrow.

For reference, it may be preferable that the engine mount having the damping control device according to various embodiments of the present invention should be electrically connected to a battery and a controller for controlling current supply of the vehicle so as to form a magnetic field according to current application.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A damping control device filled with a magnetorheological (MR) fluid, comprising:
    a lower core including an outer ring, an upper plate and a lower plate disposed inside the outer ring in parallel to each other, a plurality of connections disposed with circumferential gaps connecting the lower plate to the outer ring, and a coil provided between the upper plate and the lower plate;
    an orifice formed of a nonmagnetic material and including an outer ring, an inner ring disposed inside the outer ring, and a plurality of connections disposed in a lower end of the orifice between the outer ring and the inner ring with circumferential gaps and safely seated on the connections of the lower core when the orifice is combined inside the outer ring of the lower core;
    an upper core including an outer ring brought into close contact with an upper end of the outer ring of the lower core, a pressure-applying circular-shaped plate disposed inside the outer ring to face the upper plate and to be apart from the upper plate, and plate springs connecting the outer ring and the pressure-applying plate; and
    a membrane made of an elastic material and combined with the lower core to shield a lower end of the lower core,
    wherein, the lower core and the upper core are magnetized when a current is applied to the coil, and a predetermined amount of the MR fluid is filled therein, such that the MR fluid flows between the pressure-applying plate and the upper plate according to an elastic compression of the membrane.

2. The damping control device of claim 1, further comprising a lower cover combined with a lower portion of the upper core to shield bottom surfaces of the pressure-applying plate and the plate springs.

3. The damping control device of claim 2, wherein, at a lower end of the orifice, engagement protrusions are formed to be inserted into the gaps between the adjacent connections of the lower core.

4. The damping control device of claim 2, wherein each of the plate springs has an arc bar shape, and has one end combined with an inner circumferential surface of the outer ring of the upper core and the other end combined with an outer circumferential surface of the pressure-applying plate.

5. The damping control device of any one of claim 1, wherein, on a lower portion of the membrane, an elastic membrane cover is additionally combined.

6. An engine mount in which a hydro liquid flows between an upper fluid chamber and a lower fluid chamber along a flow path according to an elastic compression of an insulator, comprising:
    a damping control device includes
    a lower core including an outer ring, an upper plate and a lower plate disposed inside the outer ring in parallel to each other, a plurality of connections disposed with circumferential gaps connecting the lower plate to the outer ring, and a coil provided between the upper plate and the lower plate;

an orifice formed of a nonmagnetic material and including an outer ring, an inner ring disposed inside the outer ring, and a plurality of connections disposed in a lower end of the orifice between the outer ring and the inner ring with circumferential gaps and safely seated on the connections of the lower core when the orifice is combined inside the outer ring of the lower core;

an upper core including an outer ring brought into close contact with an upper end of the outer ring of the lower core, a pressure-applying circular-shaped plate disposed inside the outer ring to face the upper plate to be apart from the upper plate, and plate springs connecting the outer ring and the pressure-applying plate; and a membrane made of an elastic material and combined with the lower core to shield a lower end of the lower core, wherein, the lower core and the upper core are magnetized when a current is applied to the coil, and a predetermined amount of magnetorheological (MR) fluid is filled therein, such that the MR fluid flows between the pressure-applying plate and the upper plate according to an elastic compression of the membrane, and wherein the damping control device is provided between the upper fluid chamber and the lower fluid chamber and the pressure-applying plate elastically moves along the flow of the hydro liquid.

7. The engine mount of claim 6, wherein the damping control device is provided to be in close contact with an inner circumferential surface of the insulator to divide the upper fluid chamber and the lower fluid chamber from each other.

8. The engine mount of claim 6, further comprising an orifice plate dividing the upper fluid chamber and the lower fluid chamber from each other and having a flow path formed therein, wherein the damping control device is provided in a hole formed at the center of the orifice plate.

* * * * *